UNITED STATES PATENT OFFICE.

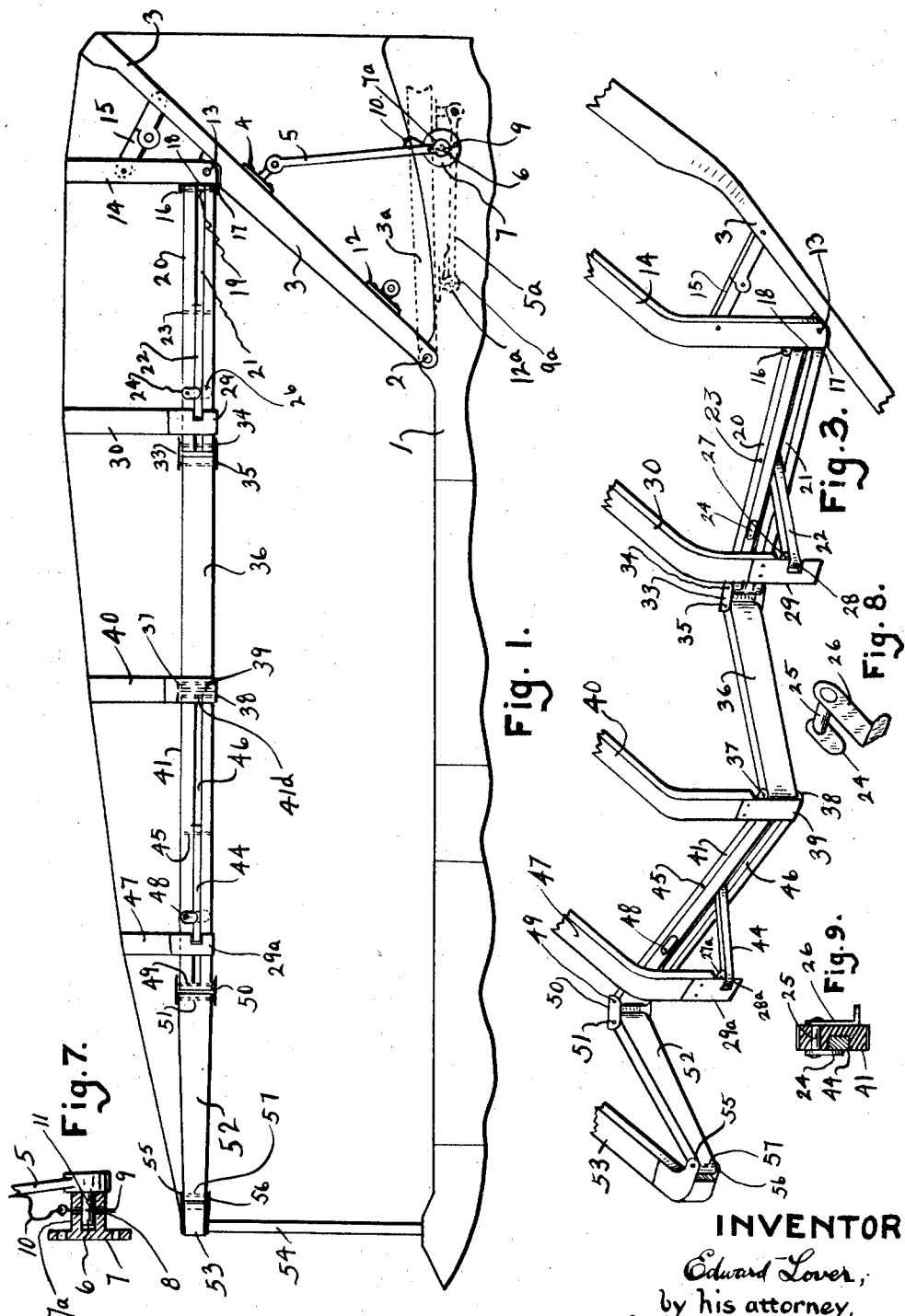

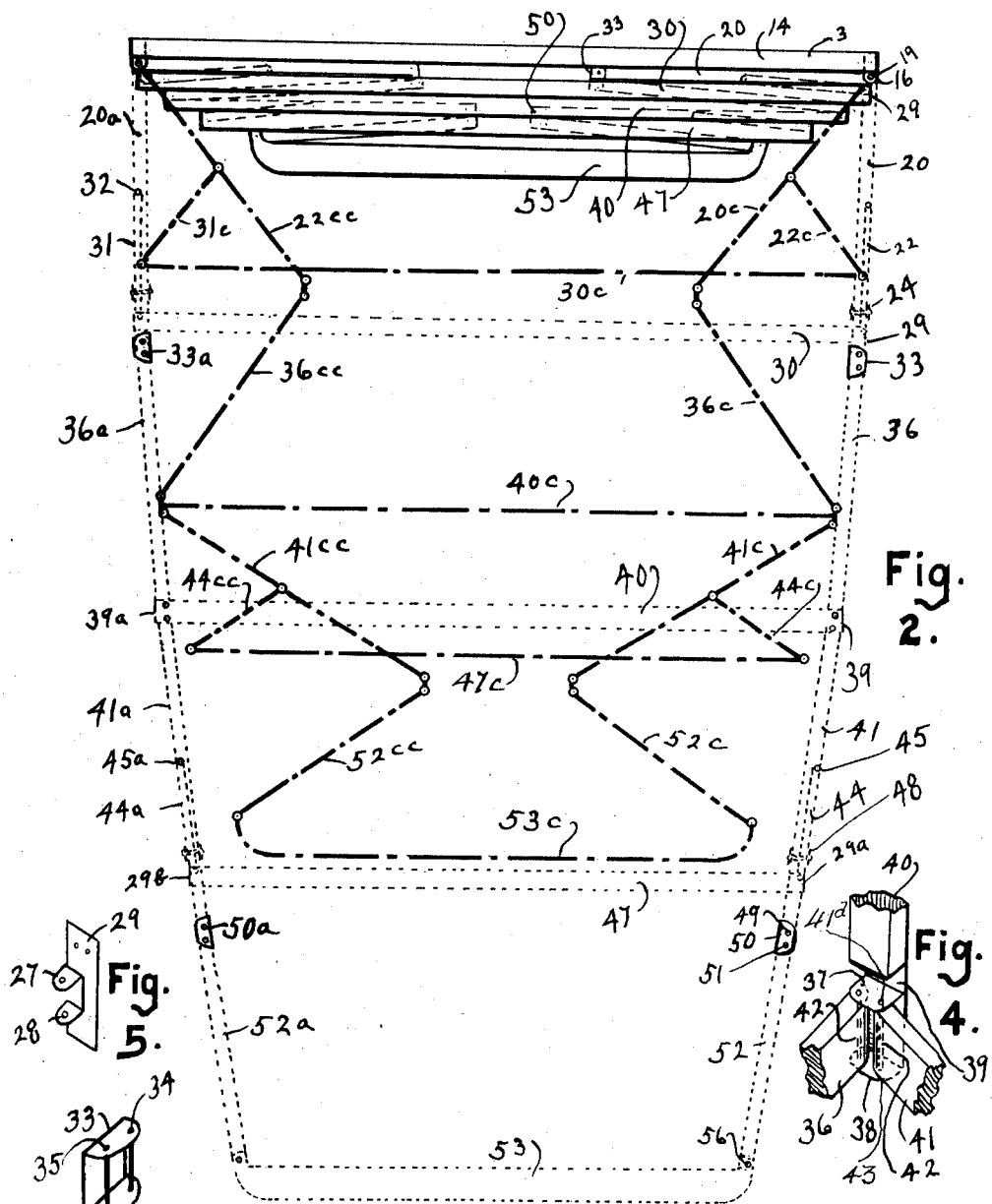

EDWARD LOVER, OF BUFFALO, NEW YORK, ASSIGNOR TO LOVER TOP AND CONVERTER CO., INC., OF BUFFALO, NEW YORK, A CORPORATION OF NEW YORK.

VEHICLE-TOP FRAME.

1,385,138.   Specification of Letters Patent.   Patented July 19, 1921.

Application filed March 14, 1919. Serial No. 282,694.

*To all whom it may concern:*

Be it known that I, EDWARD LOVER, a citizen of the United States, residing at Buffalo, in the county of Erie and State of New York, have invented certain new and useful Improvements in Vehicle-Top Frames; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to vehicle top frames.

One of the objects of this invention is to provide a jointed vehicle top frame for supporting the covering to a vehicle, particularly one having jointed members which when extended form side beams rather than a truss as in the usual top frame.

A further object is to provide with the jointed side beams, supporting arms pivoted thereto, for supporting some of the cross bows, which of necessity, becomes separated from the joints in the side beam, when the same are not fully extended.

A further object is to provide a top for vehicles which shall be strong and simple in construction and neat in appearance and one that is easily foldable into a small space, without in any way distorting, tearing or pinching the fabric covering to the frame.

Another object is to provide a top having the side beams adapted to support the covering above a clear and uninterrupted space between the rear cross bow of the vehicle and the windshield supports.

A further object of this invention is to provide a top of such a design as can be readily fitted to various lengths and widths of cars, using the same joints.

With these and other objects my invention consists in certain construction one embodiment of which is illustrated in the drawings is hereinafter described, its operation is explained and what I claim is set forth.

In the drawings,

Figure 1 is a side elevation of a vehicle top frame embodying one form of my invention.

Fig. 2 is a top plan of the frame, wherein the full lines indicate the frame in folded position, the dotted lines indicating the frame fully extended and the heavy dot and dash lines, indicate diagrammatically, the frame partially extended.

Fig. 3 is a fragmental perspective view of the top shown in Fig. 1, but here shown partly folded back.

Fig. 4 is a perspective view of a joint showing beam members and a cross bow pivotally connected together.

Fig. 5 is a perspective view showing a part of the joint between a cross bow and a supporting arm.

Fig. 6 is a perspective view of a sheet metal pivotal connection to which are journaled contiguous beam members.

Fig. 7 is a sectional elevation showing the end of one of the rear braces for the inclined bow, illustrating its connection with the permanent socket fixed upon the vehicle body.

Fig. 8 is a perspective view of the clamping device used to retain a supporting arm against the beam member to which it is pivoted.

Fig. 9 is a sectional elevation showing the clamping device journaled on a beam member and holding the supporting arm in place.

In the figures, there is shown pivoted to the body 1, an inclined cross bow 3, upon which is fixed a pivoted bracket 4, to which is pivotally connected the brace 5, terminating below in a horizontal post 6, which removably engages the socket 7. A transverse hole 8 receives a split pin 9, which is fixed to the brace 5, by the cord 10. A hole 11, in the post 6, is provided for vertically positioning the pin 9, through it when the bow 3, is in the dotted position 3ª, as will hereinafter be explained. Upon the bow 3 is fixed a socket bracket 12 for receiving the post 6, when the top frame is folded back resting upon the socket 7. Pivoted at the point 13, on the bow 3, is the rear cross bow 14 which is braced by the jointed link 15 to the bow 3. Fixed near the pivotal ends of the bow 14 and extending forward therefrom, are ears 16 and 17 of a bracket 18. Connecting the ears 16 and 17, is a pin 19, upon which is journaled a beam member 20, having a slot 21 on its outer face. Midway between the ends of the member 20 and engaging the slot 21, is a supporting arm 22, which is journaled upon the pin 23, fixed in the member 20. The arm 22 is adapted to swing about and lay in either direction within the slot 21. In Fig. 1, the arm 22 is shown held in the forward part of the slot 21, by means of the tongue 24, of the clamp, which is better shown in Figs. 8 and 9, wherein the tongue 24 is fixed at one end to a pin 25, which has fixed to its opposite end, the lever 26. The swinging end of the arm 22 is journaled upon a pin fixed in the ears 27 and 28 of a sheet metal bracket 29 which is fixed to the cross bow 30, the opposite end of which is pivotally mounted upon an arm 31, in a similar way. The arm 31 is journaled upon a pin, to the beam member 20$^a$ at the point 32. Upon the forward end of the beam member 20, is pivoted a sheet metal connection 33, which has journaled upon the pin 34, the swinging end of the arm 20. Journaled upon the pin 35, of the connection 33, is the beam member 36. A similar pivotal connection 33$^a$, joins the beam members 20$^a$ and 36$^a$ in a similar way. The beam member 36 is pivotally connected to the ears 37 and 38 of the bracket 39 which is fixed upon the cross bow 40. Also pivotally connected with the ears 37 and 38 of the bracket 39, but at a point 41$^d$ spaced from the pivotal connection of the beam member 36, with the bracket 39, is the beam member 41. Referring to Fig. 4, the beam member fragment 36, is shown journaled upon the pin 42, which is fixed in the ears 37 and 38. The fragment of the beam 41 is shown journaled upon the pin 43, which is fixed in the ears 37 and 38 of the bracket 39. The joint shown in Fig. 4 is typical of that at each end of the cross bow 40. A supporting arm 44 is journaled on a pin 45, fixed in the beam member 41 and is adapted to lay either way in a slot 46. The arm 44 is journaled upon the ears 27$^a$ and 28$^a$ of a bracket 29$^a$, similar to the bracket 29. The bracket 29$^a$ is fixed to the cross beam 47.

When the beam members are extended, as is shown in Fig. 1 the clamp 48, similar to that shown in Figs. 8 and 9, releasably holds the arm 44 in its forward position in the beam member 41. The cross bow 47 terminates on the opposite side in a bracket similar to the bracket 29$^b$ and is journaled to a supporting arm 44$^a$ similar to 44, which in turn is pivoally connected at the point 45$^a$ to a beam arm 41$^a$ similar to the beam arm 41. Pivotally connected with the outer end of the beam member 41, at the point 49, is the pivotal connection 50, which in turn is journaled upon a pin 51 of the connection 50 on the beam member 52. A similar pivotal connection on the opposite side of the top frame pivotally connects, in a similar way, the beam members 41$^a$ and 52$^a$. The beam members 50 and 52$^a$, which form the end members to the side of the frame, are pivotally connected by the cross bar 53 which is releasably attached by means not here shown to the windshield frame 54. It will be noticed that the cross beam 53 is provided with ears 55 and 56, which are spaced to include the beam member 52, journaled upon the pin 57, fixed in the ears 55 and 56. It will also be noticed that the pivotal connection at the joints between contiguous beam members, as well as between the cross bow 3 and the beam members 20 and 20$^a$, are all designed to be pivoted or journaled between spaced ears, that the pivotal bearing points are vertically spaced in axial relation to be at the upper and lower portions of the side beams of the top frame, made up of the aforesaid beam members.

Referring now to the operation of the folding and unfolding of the parts of the frame from a position of full extension, to that of being closed and resting back, where it is strapped down in the usual way, in the full line position shown in Fig. 1, the bow 3 is held by the brace 5 shown engaging a socket 7 and pinned against coming loose by the pin 9. This brace 5 rigidly holds the cross bow 3 in its inclined position. The parts can be designed to hold the bow 3 in any other position desired, but there is a position for the socket 7, which is important in the locking of the bow 3, resting thereon, as will be hereinafter explained. Thus having the bow 3 rigidly held in position, the cross bow 14 pivoted thereto, is rigidly held in position by the knee braces 15, 15, at either side thereof. The beam members 20, 36, 44, 52, 53, and corresponding ones on the opposite side, with the other cross bows 30, 40, 47, with the connections as shown and alone described, complete a fully extended formation of the members, affording a continuous beam on either side of the vehicle as a support for the cross bows and the covering. To fold the frame back, the front cross beam 53 is released from the windshield 54 and the clamps at 24 and 48 (illustrated in Figs. 8 and 9) on either side of the frame are turned horizontal to release the supporting arms 22 and 44, on either side of the frame. The joints at 33 and 50 and those opposite thereto are next pushed in, while the arms 22 and 44 are swung out in supporting the cross bows 30 and 47. The distance between the brackets 39 and 39$^a$ opposite thereto does not change while the beam members hinged thereto, turn thereon. The relation of the parts in the movement of folding or unfolding is illustrated in Figs. 2 and 3. The parts 20, 22, 30, 33, 36, 39, 40, 41, 44, 47, 50, 52, and the corresponding chords opposite thereto, in the folding of the frame, assume such position as marked by the dot and dash line of Fig. 2, taking the repective positions 20$^c$, 30$^c$, 33$^c$, 36$^c$, 39$^c$, 40$^c$, 41$^c$, 44$^c$, 29$^c$, 47$^c$, 50$^c$, 52ᶜ, 53ᶜ. After all the parts are folded back against the cross bow 14, as shown by the full line position, in Fig. 2, the knee braces 15, 15, are pushed up and the folded parts are turned back with the cross bow 14 on the pivots 13, 13, to lay against the inclined bow 3. The braces 5, 5, are next disconnected from their sockets 7, 7 and the cross bow 3 is lowered to rest in the position 3ᵃ of Fig. 1 on top of the tubular portion 7ᵃ of the socket 7. The braces 5, 5, are next brought up into the dotted position 5ᵃ and the post 6 is made to engage the socket 12, in its position 12ᵃ, and the pin 9 is passed through a hole 11, to retain the brace 5 in locked relation with the socket 12 and causing the brace 5 to clamp the tubular portion of the socket 7, between itself and the cross bow 3. To open up the frame in the extended position shown in Fig. 1 and by the dotted lines of Fig. 2, the operation of the parts just described, is reversed.

I preferably make the beam and the cross bows of wood, where it is desired to finish the same with cloth. The wooden parts are reinforced with metal both for strength, and the formation of the joints.

Having thus described my invention, I do not wish to be confined to the one embodiment of my invention herein disclosed, as modifications therein can be made without departing from the spirit and scope of my invention.

Hence I claim,

1. In a vehicle top frame adapted to support a covering over a vehicle a main cross bow pivoted on the body of said vehicle, a socket fixed to the body of said vehicle in the vicinity of said main cross bow, a brace pivoted to said cross bow and removably attached to said socket, attaching means on said cross bow positioned between its pivot point with said vehicle body and the pivotal connection of said brace with said cross bow and adapted to receive the swinging end of said brace in locked engagement to hold said socket in clamped relation between said cross bow and brace when said cross bow is laid upon said socket.

2. In a vehicle top frame adapted to support a covering over a vehicle, jointed beam members extending lengthwise of said frame and forming the sides thereof, an auxiliary arm pivoted to each of a pair of opposite beam members, midway of the ends thereof and having a swinging end beyond said last mentioned beam member, and a rigid cross beam forming a partial support for said covering having its ends pivotally connecting with said auxiliary arms.

3. In a vehicle top frame adapted to support a covering over a vehicle, two sets of jointed beam members extending lengthwise of said frame and forming the sides thereof, joints connecting the ends of contiguous beam members, a pair of opposite beam members having longitudinal slot formations, an auxiliary arm having one end pivoted within a slot of each of said slotted beam members and adapted to lie parallel to the beam to which it is pivoted within said slot, and a rigid cross bow adapted to partially support said covering, said rigid cross bow having its ends pivotally connected with said auxiliary arms.

4. In a vehicle top frame adapted to support a covering over a vehicle, jointed beam members extending lengthwise of said frame and forming the sides thereof, an auxiliary arm pivoted to each of a pair of opposite beam members, midway of the ends thereof and having a swinging end beyond said last mentioned beam member, a rigid cross beam forming a partial support for said covering having its ends pivotally connecting with said auxiliary arms, and means for locking said auxiliary arms in alinement with the respective members to which they are pivoted.

5. In a vehicle top frame adapted to support a covering over a vehicle, two sets of jointed beam members extending lengthwise of said frame and forming the sides thereof, joints connecting the ends of contiguous beam members, a pair of opposite beam members having longitudinal slot formations, an auxiliary arm having one end pivoted within a slot of each of said slotted beam members and adapted to lie parallel to the beam to which it is pivoted within said slot, a rigid cross bow adapted to partially support said covering, said rigid cross bow having its ends pivotally connected with said auxiliary arms, and means for locking said auxiliary arms in alinement with the respective members to which they are pivoted.

EDWARD LOVER.